US011603158B2

United States Patent
Xi et al.

(10) Patent No.: US 11,603,158 B2
(45) Date of Patent: Mar. 14, 2023

(54) SCOOTER

(71) Applicant: Ninebot (Beijing) Tech Co., Ltd., Beijing (CN)

(72) Inventors: Weining Xi, Beijing (CN); Zichong Chen, Beijng (CN); Yubin Yuan, Beijing (CN); Zhongyuan Chen, Beijing (CN); Bin Shen, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 972 days.

(21) Appl. No.: 16/398,303

(22) Filed: Apr. 30, 2019

(65) Prior Publication Data

US 2020/0180723 A1 Jun. 11, 2020

(30) Foreign Application Priority Data

Dec. 7, 2018 (CN) .......................... 201811498134.5

(51) Int. Cl.
*B62K 3/00* (2006.01)
*B62K 15/00* (2006.01)
(Continued)

(52) U.S. Cl.
CPC ............... *B62K 3/002* (2013.01); *B62J 11/00* (2013.01); *B62J 27/00* (2013.01); *B62J 45/41* (2020.02);
(Continued)

(58) Field of Classification Search
None
See application file for complete search history.

(56) References Cited

U.S. PATENT DOCUMENTS 10,245,937 B2 * 4/2019 Gillett ................... B62K 17/00
10,800,475 B1 * 10/2020 Luedtke .................. B62M 6/40
(Continued)

FOREIGN PATENT DOCUMENTS

CN 202608975 U 12/2012
CN 204846200 U 12/2015
(Continued)

OTHER PUBLICATIONS

The extended European search report for the EP patent application No. 19170584.7, dated Oct. 15, 2019.
(Continued)

*Primary Examiner* — Katy M Ebner
(74) *Attorney, Agent, or Firm* — Gang Yu

(57) ABSTRACT

The present disclosure provides a scooter. The scooter includes a scooter body, a driving portion, a wheel portion, a photographing portion and a control portion; the driving portion is connected with the scooter body; at least part of wheel portion is movably connected with the driving portion; the photographing portion is connected with the scooter body, so that an environment around the scooter body is photographed through the photographing portion; the control portion is connected with the scooter body; the control portion is electrically connected with the photographing portion and the wheel portion; and the control portion controls the driving portion according to a signal collected by the photographing portion, thereby driving the at least part of wheel portion to drive the scooter body to move and avoid an obstacle.

14 Claims, 5 Drawing Sheets

(51) Int. Cl.
    *B62K 11/14* (2006.01)
    *G05D 1/02* (2020.01)
    *H04N 7/18* (2006.01)
    *B62J 45/41* (2020.01)
    *B62J 45/422* (2020.01)
    *B62J 11/00* (2020.01)
    *B62J 27/00* (2020.01)

(52) U.S. Cl.
    CPC ............ *B62J 45/422* (2020.02); *B62K 11/14* (2013.01); *G05D 1/0251* (2013.01); *H04N 7/181* (2013.01); *B62K 15/006* (2013.01); *B62K 2202/00* (2013.01); *G05D 2201/0214* (2013.01)

(56) References Cited

U.S. PATENT DOCUMENTS

| | | | |
|---|---|---|---|
| 2012/0022749 A1 | 1/2012 | Clegg | |
| 2014/0196968 A1* | 7/2014 | Bieler | B62M 6/65 180/181 |
| 2016/0067588 A1 | 3/2016 | Tan et al. | |
| 2016/0325803 A1* | 11/2016 | Waxman | B62M 7/12 |
| 2017/0190335 A1* | 7/2017 | Gillett | B62K 17/00 |
| 2018/0101177 A1* | 4/2018 | Cohen | H04N 7/181 |
| 2018/0120859 A1* | 5/2018 | Eagelberg | B60W 30/18163 |
| 2018/0222473 A1* | 8/2018 | Shami | B60W 30/09 |
| 2018/0335525 A1* | 11/2018 | Niesen | G01C 21/3676 |
| 2020/0124430 A1* | 4/2020 | Bradlow | B62J 45/422 |
| 2021/0165404 A1* | 6/2021 | Gillett | B60W 60/005 |
| 2021/0253196 A1* | 8/2021 | Yokoyama | B62M 6/45 |
| 2021/0349465 A1* | 11/2021 | Gillett | B60W 10/08 |

FOREIGN PATENT DOCUMENTS

| | | |
|---|---|---|
| CN | 105644670 A | 6/2016 |
| CN | 205737878 U | 11/2016 |
| CN | 106476954 A | 3/2017 |
| CN | 106542029 A | 3/2017 |
| CN | 106672140 A | 5/2017 |
| CN | 106864458 A | 6/2017 |
| CN | 206520692 U | 9/2017 |
| CN | 107264697 A | 10/2017 |
| CN | 108693884 A | 10/2018 |
| DE | 102012220011 A1 | 5/2014 |
| DE | 102016119729 A1 | 4/2018 |
| JP | S5155779 U | 4/1976 |
| JP | H06305471 A | 11/1994 |
| JP | 2000199926 A | 7/2000 |
| JP | 3105066 U | 10/2004 |
| JP | 2007124866 A | 5/2007 |
| JP | 2007161198 A | 6/2007 |
| JP | 2017091284 A | 5/2017 |
| JP | 2017211641 A | 11/2017 |
| SG | 10201810517 Y | 6/2019 |
| WO | 2017217936 A1 | 12/2017 |
| WO | WO-2017217936 A1 * | 12/2017 ............. B60L 53/14 |

OTHER PUBLICATIONS

The Invitation pursuant to Rule 137(4) EPC and Article 94(3) EPC for EP patent application No. 19170584.7, dated Sep. 29, 2020.
The Invitation pursuant to Rule 137(4) EPC and Article 94(3) EPC for EP patent application No. 19170584.7, dated Feb. 25, 2021.
The second office action of the corresponding JP patent application No. 2019-080675, dated Dec. 15, 2020.
The second office action of the corresponding SG patent application No. 10201903583P, dated Dec. 29, 2020.

* cited by examiner

SCOOTER

TECHNICAL FIELD

The present disclosure relates to a technical field of sensor controlled vehicle devices, and in particular to a scooter.

BACKGROUND

In the related art, a photographing portion of an automatic driving scooter only can photograph a single direction of the scooter such as an advancing direction or a pre-driving direction, and cannot photograph a surrounding environment of the scooter at a wide angle, so that a surrounding driving road condition cannot be mastered accurately and a potential safety hazard is caused to the driving of the scooter.

SUMMARY

The present disclosure is mainly intended to provide a scooter to solve the problem that an automatic driving scooter cannot observe a surrounding environment simultaneously in the related art.

To this end, an embodiment of the present disclosure provided a scooter, which includes: a scooter body; a driving portion, the driving portion being connected with the scooter body; a wheel portion, at least part of the wheel portion being movably connected with the driving portion; a photographing portion, the photographing portion being connected with the scooter body, so that an environment around the scooter body is photographed by the photographing portion; and a control portion, the control portion being connected with the scooter body, the control portion being electrically connected with the photographing portion and the wheel portion, and the control portion controlling the driving portion through an image signal collected by the photographing portion, thereby driving the at least part of wheel portion to drive the scooter body to move and avoid an obstacle.

In an exemplary embodiment, the scooter body includes: a sliding plate, the sliding plate being connected with the driving portion; and a scooter rod portion, the scooter rod portion being rotatably connected with the sliding plate, a first end of the scooter rod portion being connected with the driving portion, and a second end of the scooter rod portion being connected with the photographing portion.

In an exemplary embodiment, the photographing portion includes: a photographing body, the photographing body being connected with the second end of the scooter rod portion;

a first camera, the first camera being connected with the photographing body, the first camera being electrically connected with the control portion and performing photographing work along a first direction; and a second camera, the second camera being connected with the photographing body, the second camera and the first camera being disposed oppositely, and the second camera being electrically connected with the control portion and performing photographing work along a second direction.

In an exemplary embodiment, a mounting hole is formed on the second end of the scooter rod portion; the mounting hole is a through hole; at least part of photographing portion is located in the mounting hole; and the photographing portion is a duel-fisheye photographing device.

In an exemplary embodiment, the scooter rod portion includes: a first scooter rod, a first end of the first scooter rod being connected with the sliding plate, a second end of the first scooter rod being provided with an opening, and the opening extending along a length direction of the first scooter rod to form an accommodation cavity; and a second scooter rod, a first end of the second scooter rod being movably disposed in the accommodation cavity and a second end of the second scooter rod being connected with the photographing portion.

In an exemplary embodiment, at least one of the first scooter rod and the second scooter rod is provided with a distance sensor; the distance sensor is electrically connected with the control portion; the second scooter rod is provided with a contraction portion located in the accommodation cavity and an extension position located out of the accommodation cavity; when the distance sensor detects that the second scooter rod is located at the contraction position, the control portion controls the driving portion through the image signal collected by the photographing portion to start; and when the distance sensor detects that the second scooter rod is located at the extension portion, the control portion controls the photographing portion to stop work.

In an exemplary embodiment, the scooter rod portion includes: a third scooter rod, a first end of the third scooter rod being connected with the sliding plate; and a fourth scooter rod, wherein the fourth scooter rod is hinged with a second end of the third scooter rod; the fourth scooter rod is connected with the photographing portion; the fourth scooter rod is provided with a working position connected with the third scooter rod and a folding position folded with the third scooter rod; when the fourth scooter rod is located at the working position, an axial line of the fourth scooter rod and an axial line of the third scooter rod are coaxially disposed; when the fourth scooter rod is located at the folding position, the axial line of the fourth scooter rod is formed into a first preset included angle with the axial line of the third scooter rod; and a photographing direction of the photographing portion is formed into a second preset included angle with a horizontal plane.

In an exemplary embodiment, when the fourth scooter rod is located at the folding position, the second preset included angle is 90°.

In an exemplary embodiment, at least one of the fourth scooter rod and the sliding plate is provided with a distance sensor; the distance sensor is electrically connected with the control portion; when the distance sensor detects that the fourth scooter rod is located at the folding position, the control portion controls the driving portion through the image signal collected by the photographing portion, thereby driving the at least part of wheel portion to drive the scooter body to move and avoid the obstacle; and when the distance sensor detects that the fourth scooter rod is located at the working position, the control portion controls the photographing portion to stop work.

In an exemplary embodiment, the photographing portion includes: a photographing body, the photographing body being connected with the fourth scooter rod; and a camera, the camera being connected with the photographing body, and the camera being a single-fisheye camera.

In an exemplary embodiment, the photographing portion further includes: a blocking portion, wherein the blocking portion is detachably connected with the photographing portion; at least part of the blocking portion is provided with a blocking position located on a middle portion of the camera, and an avoidance position far away from the camera; and when the blocking portion is located at the blocking position, a photographing view angle of the camera is an annular view angle.

In an exemplary embodiment, the scooter includes: an alarm portion; the alarm portion is connected with the scooter body; and the alarm portion is electrically connected with the control portion.

In an exemplary embodiment, the scooter body is provided with a mounting hole; and the photographing portion includes: a camera, the camera being disposed in the mounting hole; and a flexible portion, the flexible portion being located between the camera and a wall of the mounting hole.

In an exemplary embodiment, the driving portion includes: a first driving portion, wherein the first driving portion is disposed an inner side of the wheel portion; and the first driving portion is connected with a wheel spindle of the wheel portion, thereby driving the wheel portion to rotate around an axial line of the wheel spindle.

In an exemplary embodiment, the scooter body further includes a mounting frame; the wheel portion is rotatably mounted on the mounting frame; and the driving portion includes: a second driving portion, wherein the second driving portion is in driving connection with the mounting frame to drive the mounting frame to rotate, so that the mounting frame drives the wheel portion to steer.

In an exemplary embodiment, the second driving portion is provided with a driving wheel; a driven wheel is disposed on the mounting frame; and a transmission belt is sleeved to the driving wheel and the driven wheel, so that the driving wheel drives the driven wheel to rotate and thus the mounting frame is rotated.

In an exemplary embodiment, the scooter body includes: a sliding plate; and a scooter rod portion, the scooter rod portion being rotatably disposed relative to the sliding plate, a first end of the scooter rod portion being connected with the mounting frame, so that when the second driving portion is in a nonworking state, the wheel portion is steered by operating the scooter rod portion, and the photographing portion is disposed on a second end of the scooter rod portion.

In an exemplary embodiment, the scooter rod portion includes: a first scooter rod and a second scooter rod, wherein the second scooter rod is telescopically disposed on the first scooter rod; one end, far away from the second scooter rod, of the first scooter rod is connected with the mounting frame; and one end, far away from the first scooter rod, of the second scooter rod is configured to mount the photographing portion.

In an exemplary embodiment, the scooter is provided with a manned driving state and an unmanned driving state; the second scooter rod is provided with a contraction position and an extension portion; when the scooter is in the manned driving state, the second scooter rod is located at the extension portion, so that an operator operates the scooter rod portion to steer the wheel portion; and when the scooter is in the unmanned driving state, the second scooter rod is located at the contraction position, so that the wheel portion is driven by the driving portion to steer.

In an exemplary embodiment, the scooter rod portion includes: a third scooter rod and a fourth scooter rod, wherein the fourth scooter rod is foldablely disposed on the third scooter rod; and one end, far away from the fourth scooter rod, of the third scooter rod is connected with the mounting frame, and one end, far away from the third scooter rod, of the fourth scooter rod is configured to mount the photographing portion.

With the technical solutions of the present disclosure, by providing the photographing portion and the control portion on the scooter, the control portion controls the driving portion according to a road condition environment photographed by the photographing portion to drive the at least part of wheel portion to rotate, thus avoiding the obstacle discovered by the photographing portion; and therefore, the safety performance in driving of the scooter is improved.

BRIEF DESCRIPTION OF THE DRAWINGS

The accompanying drawings are described here to provide a further understanding of the present disclosure. The schematic embodiments and description of the present disclosure are adopted to explain the present disclosure, and do not form improper limits to the present disclosure. In the drawings.

Figure 1:
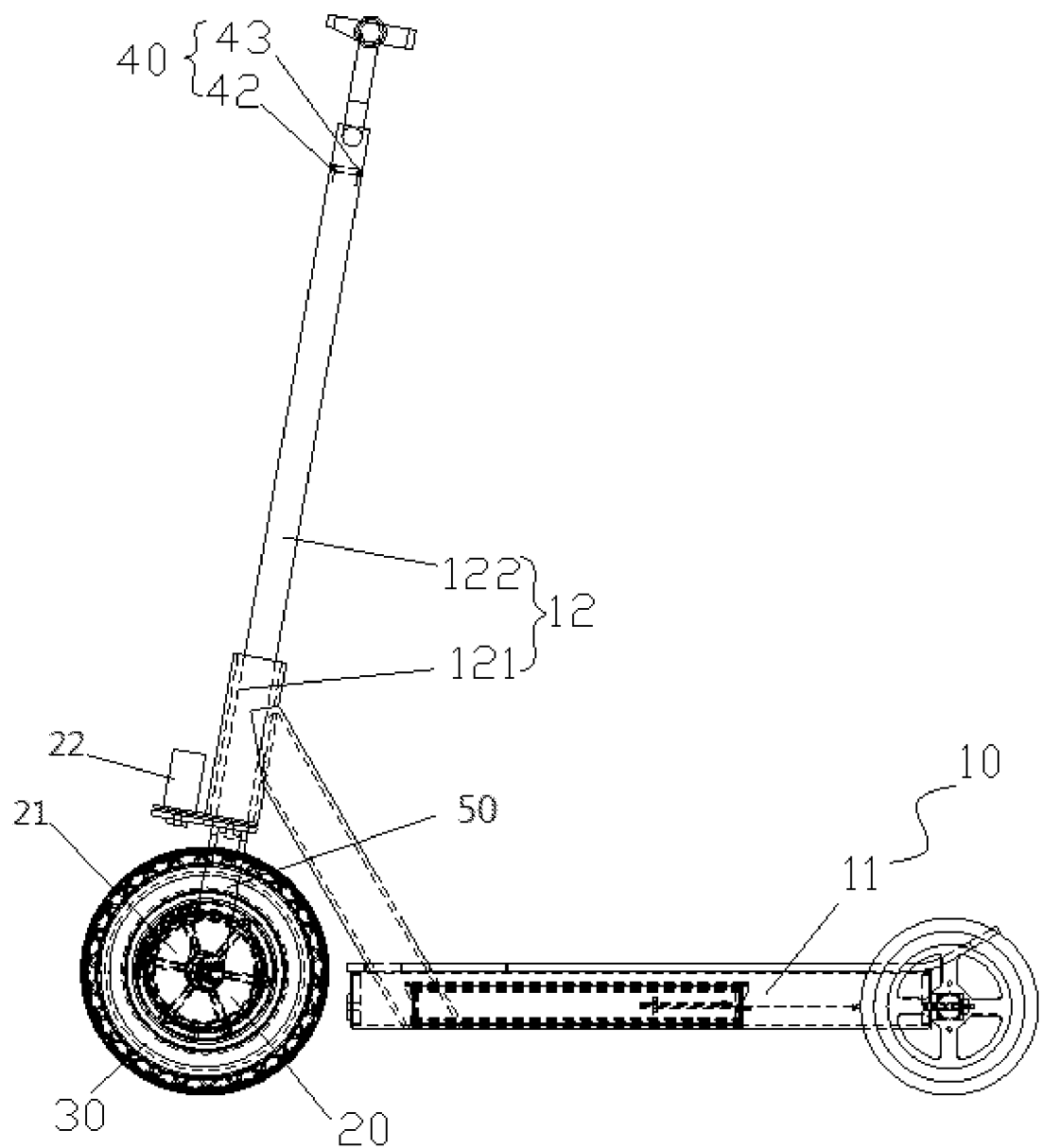
FIG. 1 illustrates a structural schematic diagram of a scooter according to a first embodiment of the present disclosure.

Herein, the drawings include the following drawing markers:

10. scooter body; 11. sliding plate; 12. scooter rod portion; 121. first scooter portion; 122. second scooter portion; 123. third scooter rod; 124. fourth scooter rod;

20. driving portion; 21. first driving portion; 22. second driving portion;

30. wheel portion;

40. photographing portion; 41. blocking portion; 42. first camera; 43. second camera;

50. mounting frame.

DETAILED DESCRIPTION OF THE EMBODIMENTS

It is to be noted that the embodiments of the present disclosure and the characteristics of the embodiments may be combined with each other if there is no conflict. The present disclosure will be described below in detail with reference to the accompanying drawings and in combination with the embodiments.

It is to be noted that the terms used herein are merely for describing the specific embodiments and are not intended to limit the exemplary embodiment of the present disclosure. As used herein, unless otherwise specified explicitly in the context, a singular form also includes a plural form. Additionally, it should be further understood that when terms such as "include", and "including" and/or "comprise" and "comprising" are used in the specification, it is indicated that a feature, a step, an operation, a device, a component and/or a combination thereof are present.

It is to be noted that, terminologies such as "first" and "second" in the specification, claims and accompanying drawings of the present disclosure are only used to distinguish similar objects, rather than to describe a special order or a precedence order. It should be understood that the terminologies used in such a way may be interchangeable in a certain cases, such that the embodiments of the present disclosure described here can be implemented in an order other than those illustrated or described here. In addition, the terms "comprises," "comprising," "includes," "including," "has," "having" or any other variation thereof are intended to cover a non-exclusive inclusion. For example, a process, method, article, or apparatus that comprises a list of steps or units is not necessarily limited to only those steps or units but may include other steps or units not expressly listed or inherent to such process, method, article, or apparatus.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

Now, the exemplary embodiments according to the present disclosure are described in detail with reference to the drawings. However, the example embodiments may be implemented in multiple different modes, and are not intended to be limited by the described implementation modes herein. It is to be understood that the implementation modes are provided so that the present disclosure is completely and totally disclosed, and the conceptions of the example implementation modes are adequately transmitted to those of ordinarily skill in the art, in the drawings, for clarity, the thicknesses of layers and areas may be enlarged, and the same drawing mark is used for representing the same device, so that their description is omitted.

As shown in FIG. 1 to FIG. 7, according to an embodiment of the present disclosure, there is provided a scooter.

In an exemplary embodiment, as shown in FIG. 1, the scooter includes a scooter body 10, a driving portion 20, a wheel portion 30, a photographing portion 40 and a control portion; the driving portion 20 is connected with the scooter body 10; at least part of the wheel portion 30 is movably connected with the driving portion 20; the photographing portion 40 is connected with the scooter body 10, so that an environment around the scooter body 10 is photographed by the photographing portion 40; the control portion is connected with the scooter body 10; the control portion is electrically connected with the photographing portion 40 and the wheel portion 30; and the control portion controls the driving portion 20 through an image signal collected by the photographing portion 40, thereby driving the at least part of the wheel portion 30 to drive the scooter body 10 to move and avoid an obstacle.

In this embodiment, by providing the photographing portion and the control portion on the scooter, according to a road condition environment photographed by the photographing portion, the control portion controls the driving portion to drive the at least part of the wheel portion to rotate, thus avoiding the obstacle discovered by the photographing portion; and therefore, the safety performance in driving of the scooter is improved.

In this embodiment, the scooter body 10 includes a sliding plate 11 and a scooter rod portion 12; the sliding plate 11 is connected with the driving portion 20; the scooter rod portion 12 is rotatably connected with the sliding plate 11; and a first end of the scooter rod portion 12 is connected with the driving portion 20, and a second end of the scooter rod portion 12 is connected with the photographing portion 40. In this way, the photographing portion is connected with the second end of the scooter rod portion 12, so that the photographing portion has a certain height to better observe the surrounding environment; and the control portion controls the driving portion according to the road condition environment photographed by the photographing portion to drive the at least part of the wheel portion to rotate, thus avoiding the obstacle discovered by the photographing portion; and therefore, the safety performance in driving of the scooter is improved.

Figure 2:
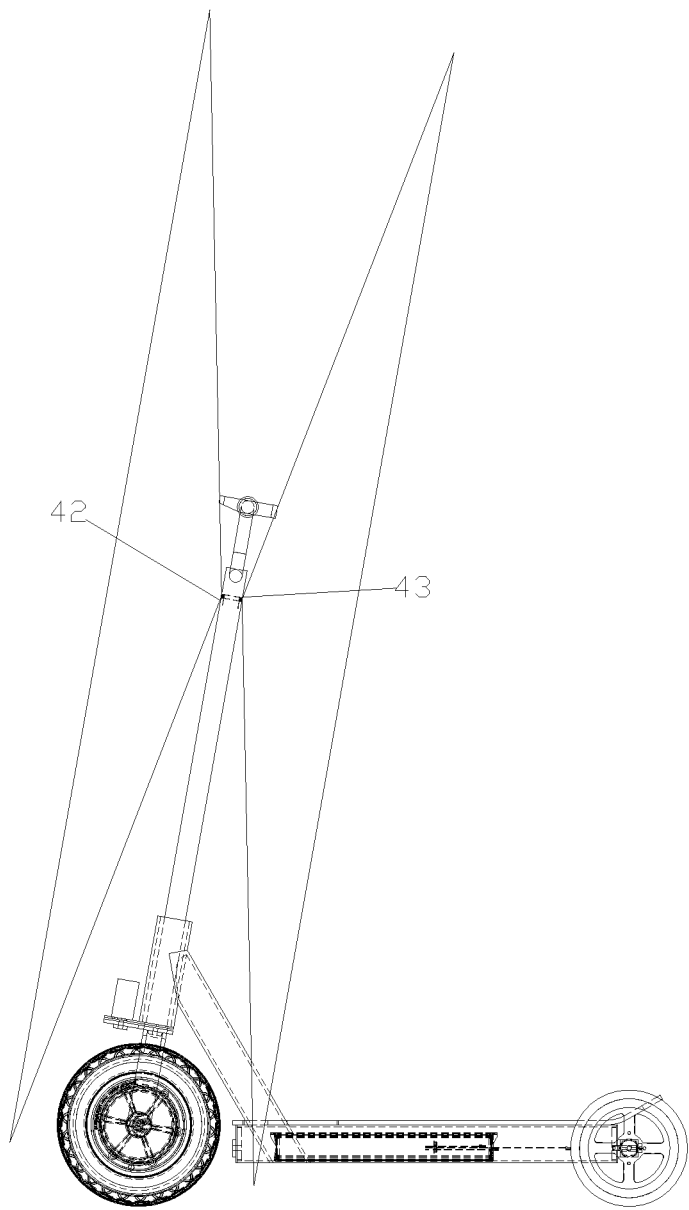
FIG. 2 illustrates a structural schematic diagram of a photographing view angle of a photographing portion of a scooter according to a first embodiment of the present disclosure.

As shown in FIG. 1 and FIG. 2, the photographing portion 40 includes a photographing body, a first camera 42 and a second camera 43; the photographing body is connected with the second end of the scooter rod portion 12; the first camera 42 is connected with the photographing body; the first camera 42 is electrically connected with the control portion and performs photographing work along a first direction; the second camera 43 is connected with the photographing body; the second camera 43 and the first camera 42 are disposed oppositely; and the second camera 43 is electrically connected with the control portion and performs photographing work along a second direction. With such a manner, the photographing portion 40 observes in an all-around manner by the cameras in different directions, and thus the safety performance in the driving of the scooter is improved.

In an exemplary embodiment, the photographing portion 40 includes a photographing body, the photographing body is connected with the second end of the scooter rod portion 12; a first camera 42, the first camera 42 is connected with the photographing body, and the first camera 42 is electrically connected with the control portion, so that the control portion obtains image information collected by the first camera 42; and a second camera 43, the second camera 43 is connected with the photographing body, and the second camera 43 is electrically connected with the control portion, so that the control portion obtains image information collected by the second camera 43, where a facing direction of the second camera 43 and a facing direction of the first camera 42 are opposite.

In this embodiment, a mounting hole is formed on the second end of the scooter rod portion 12; the mounting hole is a through hole; at least part of photographing portion 40 is located in the mounting hole; and the photographing portion 40 is a duel-fisheye photographing device. In this way, the duel-fisheye photographing device is installed conveniently by the through hole, and the surrounding environment is observed by front and rear cameras of the duel-fisheye photographing device.

In an exemplary embodiment, a mounting hole is formed on the second end of the scooter rod portion 12; the mounting hole is a through hole; at least part of the photographing portion 40 is located in the mounting hole; the photographing portion 40 is a duel-fisheye photographing device; and at least part of each of the cameras of the duel-fisheye photographing device is located an outer side of the mounting hole.

As shown in FIG. 1 and FIG. 2, the scooter rod portion 12 includes a first scooter rod 121 and a second scooter rod 122; a first end of the first scooter rod 121 is connected with the sliding plate 11; a second end of the first scooter rod 121 is provided with an opening; the opening extending along a length direction of the first scooter rod 121 to form an accommodation cavity; a first end of the second scooter rod 122 is movably disposed in the accommodation cavity and a second end of the second scooter rod 122 is connected with the photographing portion 40. In this way, when the scooter is in the unmanned driving state, by changing a position of the second scooter rod 122, a gravity center of the scooter is lowered and thus the safety performance of the scooter in the unmanned driving is improved.

In an exemplary embodiment, at least one of the first scooter rod 121 and the second scooter rod 122 is provided with a distance sensor; the distance sensor is electrically connected with the control portion; the second scooter rod 122 is provided with a contraction portion located in the accommodation cavity and an extension position located out of the accommodation cavity; when the distance sensor detects that the second scooter rod 122 is located at the contraction position, the control portion controls the driving portion 20 through the image signal collected by the photographing portion 40 to start; and when the distance sensor detects that the second scooter rod 122 is located at the extension portion, the control portion controls the photographing portion 40 to stop work. By providing the distance sensor to detect a relative distance between the first scooter rod 121 and the second scooter rod 122, whether the scooter is in the unmanned driving state or the manned driving state is judged; when the scooter is in the unmanned driving state, the photographing portion is started to work; and when the scooter is in the manned driving state, the photographing portion is not started.

In an exemplary embodiment, a distance sensor is disposed on the first scooter rod 121 and/or the second scooter rod 122, so as to detect the second scooter rod 122 is at a contraction position or an extension position by the distance sensor; the driving portion 20 is provided with a second driving portion 22 for driving the wheel portion 30 to steer; the control portion is connected with the distance sensor; as a result, when the distance sensor detects that the second scooter rod 122 is located at the contraction position, the control portion controls the second driving portion 22 through the image signal collected by the photographing portion 40 to act and the wheel portion 30 is steered under the driving of the second driving portion 22; and when the distance sensor detects that the second scooter rod 122 is located at the extension position, the control portion controls the photographing portion 40 and the second driving portion 22 to stop work, and thus the wheel portion 30 is steered under an operation of the operator.

Figure 4:
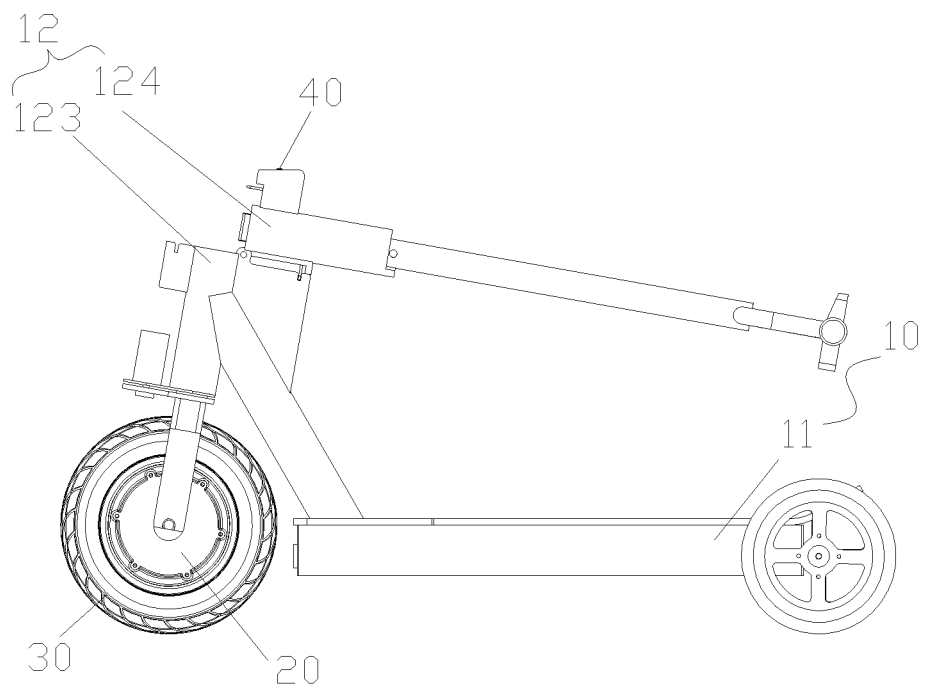
FIG. 4 illustrates a structural schematic diagram of a scooter according to a third embodiment of the present disclosure.
Figure 6:
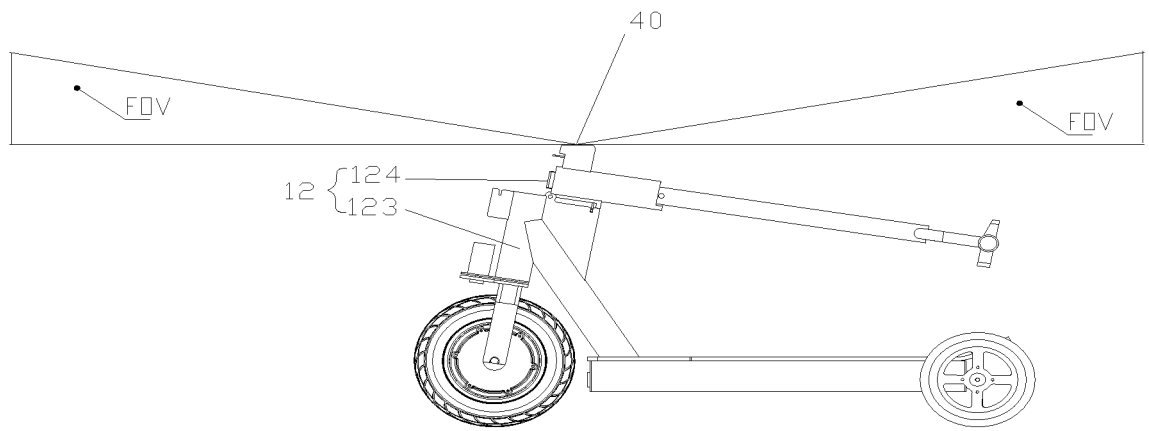
FIG. 6 illustrates a structural schematic diagram of a photographing view angle of a photographing portion of a scooter according to a second embodiment of the present disclosure.
Figure 7:
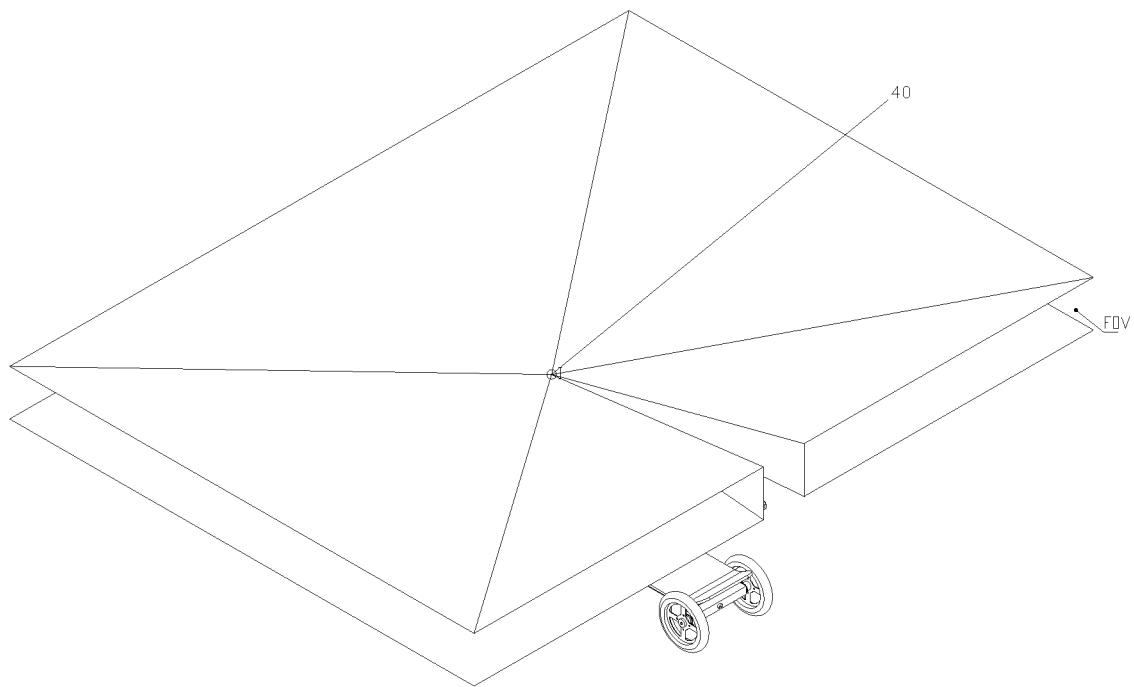
FIG. 7 illustrates a structural schematic diagram of a photographing view angle of a photographing portion of a scooter according to a third embodiment of the present disclosure.

As shown in FIG. 4, FIG. 6 and FIG. 7, the scooter rod portion 12 includes a third scooter rod 123 and a fourth scooter rod 124; a first end of the third scooter rod 123 is connected with the sliding plate 11; the fourth scooter rod 124 is hinged with a second end of the third scooter rod 123; the fourth scooter rod 124 is connected with the photographing portion 40; the fourth scooter rod 124 is provided with a working position connected with the third scooter rod 123 and a folding position folded with the third scooter rod 123; when the fourth scooter rod 124 is located at the working position, axial lines of the fourth scooter rod 124 and the third scooter rod 123 are coaxially disposed; when the fourth scooter rod 124 is located at the folding position, the axial line of the fourth scooter rod 124 is formed into a first preset included angle with the axial line of the third scooter rod 123; and a photographing direction of the photographing portion 40 is formed into a second preset included angle with a horizontal plane. In this way, when the scooter is in the unmanned driving state, the gravity center is lowered; the photographing portion can change a photographing angle along with the folding of the fourth scooter rod 124; when the fourth scooter rod 124 is located at the folding position, the second preset included angle is 90°; and therefore, the photographing portion 40 can photograph the surrounding environmental road condition to the greatest extent.

In this embodiment, at least one of the fourth scooter rod 124 and the sliding plate 11 is provided with a distance sensor; the distance sensor is electrically connected with the control portion; when the distance sensor detects that the fourth scooter rod 124 is located at the folding position, the control portion controls the driving portion 20 through the image signal collected by the photographing portion 40, thereby driving the at least part of wheel portion 30 to drive the scooter body 10 to move and avoid the obstacle; and when the distance sensor detects that the fourth scooter rod 124 is located at the working position, the control portion controls the photographing portion 40 to stop work. By providing the distance sensor to detect that the fourth scooter rod 124 and the third scooter rod 123 are at the working position or the folding position, whether the scooter is in the unmanned driving state or the manned driving state is judged; when the scooter is in the unmanned driving state, the photographing portion is started to work; and when the scooter is in the manned driving state, the photographing portion is not started.

In an exemplary embodiment, the scooter is provided with a manned driving state and an unmanned driving state; the fourth scooter rod 124 is provided with a working position docked with the third scooter rod 123 and a folding position inclined relative to the third scooter rod 123; when the scooter is in the manned driving state, the fourth scooter rod 124 is located at the working position, so that the operator steers the wheel portion 30 by operating the scooter rod portion 12; when the scooter is in the unmanned driving state, the fourth scooter rod 124 is located at the folding position and the driving portion 20 drives the wheel portion 30 to steer. A distance sensor is disposed on the third scooter rod 123 and/or the fourth scooter rod 124, so as to detect the fourth scooter rod 124 is at the working position or the folding position by the distance sensor; the driving portion 20 is provided with a second driving portion 22 for driving the wheel portion 30 to steer; the control portion is connected with the distance sensor; as a result, when the distance sensor detects that the fourth scooter rod 124 is located at the folding position, the control portion controls the second driving portion 22 through the image signal collected by the photographing portion 40 to act and the wheel portion 30 is steered under the driving of the second driving portion 22; and when the distance sensor detects that the fourth scooter rod 124 is located at the working position, the control portion controls the photographing portion 40 and the second driving portion 22 to stop work, and thus the wheel portion 30 is steered under an operation of the operator.

In this embodiment, the photographing portion 40 includes a photographing body and a camera; the photographing body is connected with the fourth scooter rod 124; the camera is connected with the photographing body; and the camera is a single-fisheye camera. The single-fisheye camera can provide a view angle for wide-angle photographing, so that the surrounding environment can be effectively observed.

Figure 5:
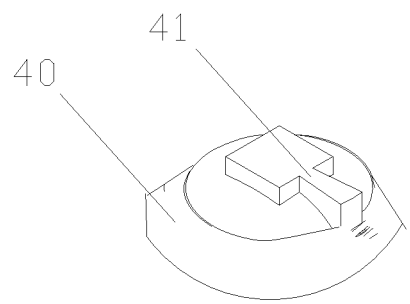
FIG. 5 illustrates a structural schematic diagram of a photographing portion of a scooter according to a first embodiment, a second embodiment and a third embodiment of the present disclosure.

As shown in FIG. 5, FIG. 6 and FIG. 7, the photographing portion 40 further includes a blocking portion 41; the blocking portion is detachably connected with the photographing portion; at least part of the blocking portion 41 is provided with a blocking position located on a middle portion of the camera, and an avoidance position far away from the camera; and when the blocking portion 41 is located at the blocking position, a photographing view angle of the camera is an annular view angle. When the blocking portion 41 is located at the blocking position on the middle portion of the camera, the problem of privacy invasion due to the direct photographing of the photographing portion from bottom to top is prevented; and since the annular view angle does not cause the direct photographing along a vertical direction, the embarrassment due to the fact that the personal privacy is photographed unintentionally is prevented. A field of view (FOV) area is an annular view angle area in FIG. 6 and FIG. 7.

In this embodiment, the scooter includes an alarm portion; the alarm portion is connected with the scooter body 10; and the alarm portion is electrically connected with the control portion. With such a manner, the scooter can alarm a pedestrian in the unmanned driving state. For example, a sound alarm is adopted in daytime and a light flash alarm is adopted in nighttime. In specific implementation, the alarm portion is mounted on the scooter body 10, and the control portion is connected with the alarm portion, so that when the scooter is in the unmanned driving state, the control portion controls the alarm portion to send an alarm signal.

The scooter body 10 is provided with a mounting hole; the photographing portion 40 includes a camera and a flexible portion; the camera is disposed in the mounting hole; the flexible portion is located between the camera and a wall of the mounting hole; and the flexible portion may be a rubber pad. The flexible portion protects the photographing portion 40, so that the service life of the photographing portion 40 is improved.

The scooter of the present disclosure will be described below in more detail in combination with the accompanying drawings.

As shown in FIG. 1 to FIG. 7, the scooter of the present disclosure includes a scooter body 10, a driving portion 20, a wheel portion 30, a photographing portion 40 and a control portion; the driving portion 20 is connected with the scooter body 10; at least part of wheel portion 30 is movably connected with the driving portion 20; the photographing portion 40 is connected with the scooter body 10, so that an environment around the scooter body 10 is photographed through the photographing portion 40; the control portion is connected with the scooter body 10; the control portion is electrically connected with the photographing portion 40 and the wheel portion 30; and the control portion controls the driving portion 20 through an image signal collected by the photographing portion 40, thereby driving the at least part of wheel portion 30 to drive the scooter body 10 to move and avoid an obstacle.

In an exemplary embodiment, as shown in FIG. 1, the driving portion 20 includes a first driving portion 21; the first driving portion 21 is disposed an inner side of the wheel portion 30; and the first driving portion 21 is connected with the wheel spindle of the wheel portion 30, thereby driving the wheel portion 30 to rotate around an axial line of the wheel spindle.

In this embodiment, as shown in FIG. 1, the scooter body 10 further includes a mounting frame 50; the wheel portion 30 is rotatably mounted on the mounting frame 50; the driving portion 20 includes a second driving portion 22; and the second driving portion 22 is in driving connection with the mounting frame 50 to drive the mounting frame 50 to rotate, so that the mounting frame 50 drives the wheel portion 30 to steer.

In an exemplary embodiment, the second driving portion 22 is provided with a driving wheel; a driven wheel is disposed on the mounting frame 50; and a transmission belt is sleeved to the driving wheel and the driven wheel, so that the driving wheel drives the driven wheel to rotate and thus the mounting frame 50 is rotated.

In an exemplary embodiment, as shown in FIG. 1 to FIG. 4, the scooter body 10 includes a sliding plate 11 and a scooter rod portion 12; the scooter rod portion 12 is rotatably disposed relative to the sliding plate 11; a first end of the scooter rod portion 12 is connected with the mounting frame 50, so that when the second driving portion 22 is in a nonworking state, the wheel portion 30 is steered by operating the scooter rod portion 12; and the photographing portion 40 is disposed on a second end of the scooter rod portion 12.

In this embodiment, as shown in FIG. 1, the scooter rod portion 12 includes a first scooter rod 121 and a second scooter rod 122; the second scooter rod 122 is telescopically disposed on the first scooter rod 121; one end, far away from the second scooter rod 122, of the first scooter rod 121 is connected with the mounting frame 50; and one end, far away from the first scooter rod 121, of the second scooter rod 122 is configured to mount the photographing portion 40.

In this embodiment, the scooter is provided with a manned driving state and an unmanned driving state; the second scooter rod 122 is provided with a contraction position and an extension portion; when the scooter is in the manned driving state, the second scooter rod 122 is located at the extension portion, so that an operator operates the scooter rod portion 12 to steer the wheel portion 30; and when the scooter is in the unmanned driving state, the second scooter rod 122 is located at the contraction position, so that the wheel portion 30 is driven by the driving portion 20 to steer.

Figure 3:
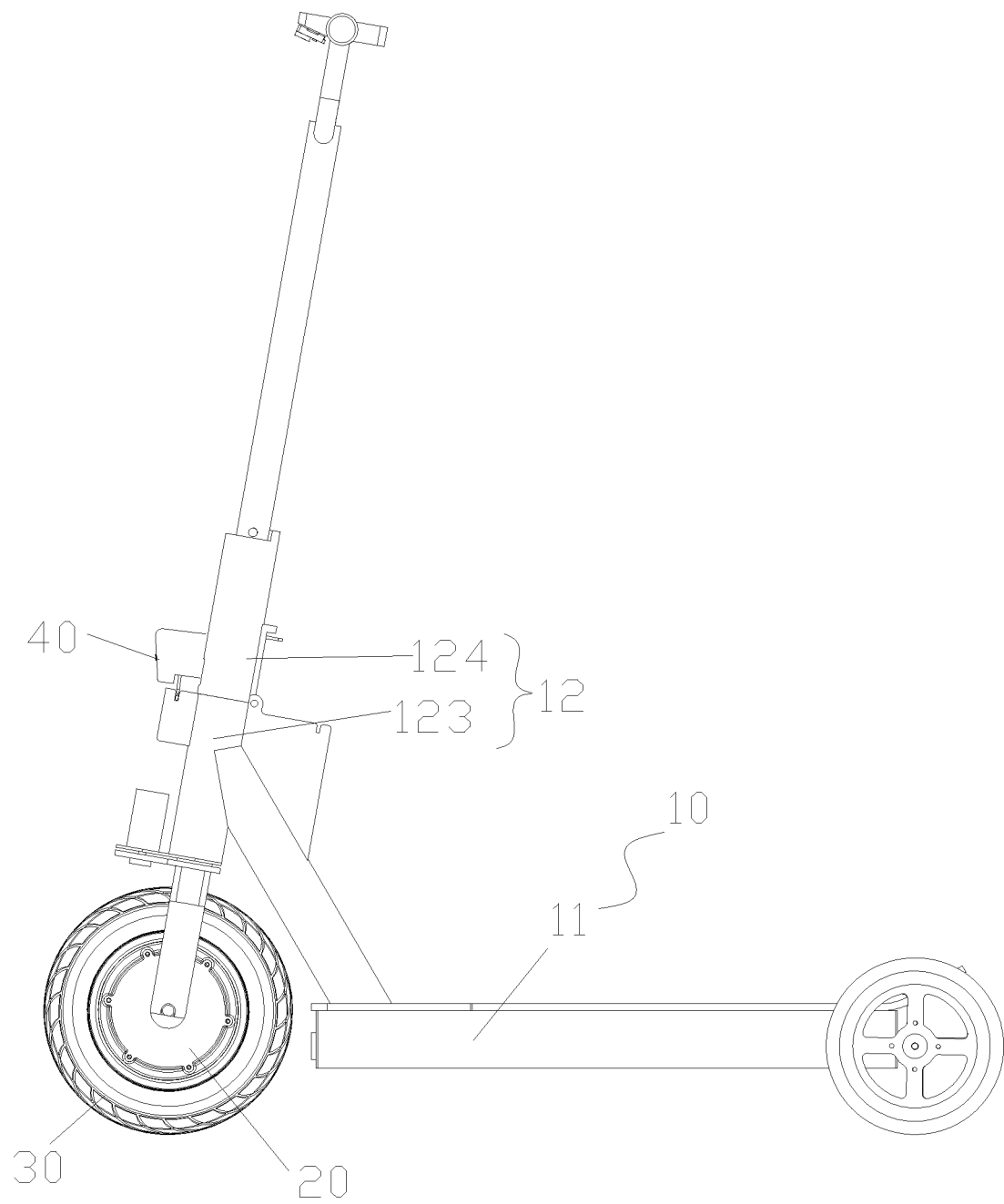
FIG. 3 illustrates a structural schematic diagram of a scooter according to a second embodiment of the present disclosure.

In an exemplary embodiment, as shown FIG. 3, FIG. 4 and FIG. 6, the scooter rod portion 12 includes a third scooter rod 123 and a fourth scooter rod 124; the fourth scooter rod 124 is foldablely disposed on the third scooter rod 123; and one end, far away from the fourth scooter rod 124, of the third scooter rod 123 is connected with the mounting frame 50, and one end, far away from the third scooter rod 123, of the fourth scooter rod 124 is configured to mount the photographing portion 40.

Besides, reference throughout this specification to "one embodiment", "another embodiment", "embodiments" or the like means that one or more particular features, structures, or characteristics described in connection with an embodiment are included in at least one embodiment of the present disclosure. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be implemented in connection with other embodiments.

In the above embodiments, the description on each embodiment has its preference. The part not detailed in one embodiment may be referred to related description in other embodiments.

The above are only preferred embodiments of the present disclosure not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. A scooter, comprising:
   a scooter body;
   a driving portion, the driving portion being connected with the scooter body;
   a wheel portion, at least part of the wheel portion being movably connected with the driving portion;
   a photographing portion, the photographing portion being connected with the scooter body, so that an environment around the scooter body is photographed by the photographing portion; and
   a control portion, the control portion being connected with the scooter body, the control portion being electrically connected with the photographing portion and the wheel portion, and the control portion controlling the driving portion through an image signal collected by the photographing portion, thereby driving the at least part of wheel portion to drive the scooter body to move and avoid an obstacle;
   a sliding plate, the sliding plate being connected with the driving portion; and
   a scooter rod portion, the scooter rod portion being rotatably connected with the sliding plate, a first end of the scooter rod portion being connected with the driving portion, and a second end of the scooter rod portion being connected with the photographing portion;
   wherein the photographing portion comprises:
   a photographing body, the photographing body being connected with the second end of the scooter rod portion;
   a first camera, the first camera being connected with the photographing body, the first camera being electrically connected with the control portion and performing photographing work along a first direction; and
   a second camera, the second camera being connected with the photographing body, the second camera and the first camera being disposed oppositely, and the second camera being electrically connected with the control portion and performing photographing work along a second direction;
   wherein the scooter rod portion comprises:
   a first scooter rod, a first end of the first scooter rod being connected with the sliding plate, a second end of the first scooter rod being provided with an opening, and the opening extending along a length direction of the first scooter rod to form an accommodation cavity; and
   a second scooter rod, a first end of the second scooter rod being movably disposed in the accommodation cavity and a second end of the second scooter rod being connected with the photographing portion;
   wherein at least one of the first scooter rod and the second scooter rod is provided with a distance sensor; the distance sensor is electrically connected with the control portion: the second scooter rod is provided with a contraction portion located in the accommodation cavity and an extension position located out of the accommodation cavity; when the distance sensor detects that the second scooter rod is located at the contraction position, the control portion controls the driving portion through the image signal collected by the photographing portion to start; and when the distance sensor detects that the second scooter rod is located at the extension portion, the control portion controls the photographing portion to stop work; or
   wherein the scooter rod portion comprises:
   a third scooter rod, a first end of the third scooter rod being connected with the sliding plate; and
   a fourth scooter rod, wherein the fourth scooter rod is hinged with a second end of the third scooter rod; the fourth scooter rod is connected with the photographing portion;
   the fourth scooter rod is provided with a working position connected with the third scooter rod and a folding position folded with the third scooter rod; when the fourth scooter rod is located at the working position, an axial line of the fourth scooter rod and an axial line of the third scooter rod are coaxially disposed; when the fourth scooter rod is located at the folding position, the axial line of the fourth scooter rod is formed into a first preset included angle with the axial line of the third scooter rod; and a photographing direction of the photographing portion is formed into a second preset included angle with a horizontal plane;
   wherein at least one of the fourth scooter rod and the sliding plate is provided with a distance sensor; the distance sensor is electrically connected with the control portion; when the distance sensor detects that the fourth scooter rod is located at the folding position, the control portion controls the driving portion through the image signal collected by the photographing portion, thereby driving the at least part of wheel portion to drive the scooter body to move and avoid the obstacle; and when the distance sensor detects that the fourth scooter rod is located at the working position, the control portion controls the photographing portion to stop work.

2. The scooter as claimed in claim 1, wherein a mounting hole is formed on the second end of the scooter rod portion; the mounting hole is a through hole; at least part of photographing portion is located in the mounting hole; and the photographing portion is a duel-fisheye photographing device.

3. The scooter as claimed in claim 1, wherein when the fourth scooter rod is located at the folding position, the second preset included angle is 90°.

4. The scooter as claimed in claim 1, wherein the photographing portion comprises:
   a photographing body, the photographing body being connected with the fourth scooter rod; and
   a camera, the camera being connected with the photographing body, and the camera being a single-fisheye camera.

5. The scooter as claimed in claim 4, wherein the photographing portion further comprises:
   a blocking portion, wherein the blocking portion is detachably connected with the photographing portion; at least part of the blocking portion is provided with a blocking position located on a middle portion of the camera, and an avoidance position far away from the camera; and when the blocking portion is located at the blocking position, a photographing view angle of the camera is an annular view angle.

6. The scooter as claimed in claim 1, wherein the scooter comprises:
   an alarm portion, wherein the alarm portion is connected with the scooter body; and the alarm portion is electrically connected with the control portion.

7. The scooter as claimed in claim 1, wherein the scooter body is provided with a mounting hole; and the photographing portion comprises:
   a camera, the camera being disposed in the mounting hole; and
   a flexible portion, the flexible portion being located between the camera and a wall of the mounting hole.

8. The scooter as claimed in claim 1, wherein the driving portion comprises:
   a first driving portion, wherein the first driving portion is disposed an inner side of the wheel portion; and the first driving portion is connected with a wheel spindle of the wheel portion, thereby driving the wheel portion to rotate around an axial line of the wheel spindle.

9. The scooter as claimed in claim 8, wherein the scooter body further comprises a mounting frame; the wheel portion is rotatably mounted on the mounting frame; and the driving portion comprises:
   a second driving portion, wherein the second driving portion is in driving connection with the mounting frame to drive the mounting frame to rotate, so that the mounting frame drives the wheel portion to steer.

10. The scooter as claimed in claim 9, wherein the second driving portion is provided with a driving wheel; a driven wheel is disposed on the mounting frame; and a transmission belt is sleeved to the driving wheel and the driven wheel, so that the driving wheel drives the driven wheel to rotate and thus the mounting frame is rotated.

11. The scooter as claimed in claim 9, wherein the scooter body comprises:
   a sliding plate; and
   a scooter rod portion, the scooter rod portion being rotatably disposed relative to the sliding plate, a first end of the scooter rod portion being connected with the mounting frame, so that when the second driving portion is in a nonworking state, the wheel portion is steered by operating the scooter rod portion, and the photographing portion being disposed on a second end of the scooter rod portion.

12. The scooter as claimed in claim 11, wherein the scooter rod portion comprises:
   a first scooter rod and a second scooter rod, wherein the second scooter rod is telescopically disposed on the first scooter rod; one end, far away from the second scooter rod, of the first scooter rod is connected with the mounting frame; and one end, far away from the first scooter rod, of the second scooter rod is configured to mount the photographing portion.

13. The scooter as claimed in claim 12, wherein
   the scooter is provided with a manned driving state and an unmanned driving state; the second scooter rod is provided with a contraction position and an extension position; when the scooter is in the manned driving state, the second scooter rod is located at the extension position, so that an operator operates the scooter rod portion to steer the wheel portion; and when the scooter is in the unmanned driving state, the second scooter rod is located at the contraction position, so that the wheel portion is driven by the driving portion to steer.

14. The scooter as claimed in claim 11, wherein the scooter rod portion comprises:
   a third scooter rod and a fourth scooter rod, wherein the fourth scooter rod is foldablely disposed on the third scooter rod; and one end, far away from the fourth scooter rod, of the third scooter rod is connected with the mounting frame, and one end, far away from the third scooter rod, of the fourth scooter rod is configured to mount the photographing portion.

* * * * *